United States Patent [19]

Nishihara et al.

[11] 4,436,683

[45] Mar. 13, 1984

[54] METHOD FOR FABRICATING AN INFORMATION SIGNAL RECORDED MEDIUM OF THE ELECTROSTATIC CAPACITY TYPE

[75] Inventors: Yoshiki Nishihara, Yokohama; Kazumichi Miyamoto, Ichikawa, both of Japan

[73] Assignee: Victor Company of Japan, Ltd., Yokohama, Japan

[21] Appl. No.: 437,679

[22] Filed: Oct. 29, 1982

[30] Foreign Application Priority Data

Nov. 2, 1981 [JP] Japan ................................. 56-174513

[51] Int. Cl.³ .............................................. B29D 17/00
[52] U.S. Cl. ................................................... 264/107
[58] Field of Search ................ 264/104, 105, 106, 107

[56] References Cited

U.S. PATENT DOCUMENTS 4,327,048  4/1982  Nyman et al. ...................... 264/107

FOREIGN PATENT DOCUMENTS 2062531  5/1981  United Kingdom ................ 264/106

Primary Examiner—James H. Derrington
Attorney, Agent, or Firm—Lowe, King, Price & Becker

[57] ABSTRACT

A method of fabricating an information signal recorded medium of the electrostatic capacity type is disclosed. The medium is made of a vinyl chloride resin composition comprising a conductive material such as carbon black. The resin composition is applied with water or steam when kneaded at high temperatures, by which deposition of undesirable inorganic impurities such as alkali metal or alkaline earth metal salts on the medium surface can be avoided as will otherwise be experienced. The water or steam is substantially removed by completion of the kneading.

6 Claims, No Drawings

METHOD FOR FABRICATING AN INFORMATION SIGNAL RECORDED MEDIUM OF THE ELECTROSTATIC CAPACITY TYPE

BACKGROUND OF THE INVENTION

1. Field of the Invention

This invention relates to a method for fabricating recorded media such as video discs, digital audio discs and the like.

2. Description of the Prior Art

Several reproducing systems using different types of recorded media are known. One of the known reproducing systems is a so-called electrostatic capacity reproducing system in which there is used an information signal recorded medium where pits are formed in a plane or a groove of the medium according to intended information signals. As the result, the information signals are recorded as changes in geometry. When the recorded information signals are reproduced, a reproducing stylus provided with an electrode is scanned relative to the recorded tracks of the medium. At the time, an electrostatic capacity is established between the electrode of the reproducing stylus and the recorded medium. This capacity varies depending on the geometrical change of the pits, which variation is utilized for the reproduction of the recorded information signals.

As the recorded medium for use in the electrostatic capacity reproducing system of the just-described type, there has been proposed a medium which comprises a thin metallic film, as an electrode, with a thickness of, for example, several hundreds angstrom by which an electrostatic capacity is formed through the electrode of the recording stylus on the surface of the recorded medium which has been press molded as having, for example, an intended change in pits or in a geometrical pattern. The thin metallic film is formed thereon with a dielectric thin film so as to protect the metallic film, to prevent the short-circuiting of the electrodes and to increase the dielectric constant between the electrodes. However, this recorded medium has the drawbacks in that a number of fabrication steps are needed including the step of press-molding a recorded medium itself, the step of depositing a thin metallic film, the step of depositing a thin dielectric film and the like. Accordingly, the fabrication becomes complicate and troublesome with a large-scale fabrication apparatus being needed, leading to a very high production cost.

On the other hand, there is also proposed another type of an information signal recorded medium of the electrostatic capacity type. This medium is made as follows. For instance, starting materials for the medium such as a vinyl chloride resin, a dibutyltin stabilizer, an epoxy stabilizer, silicone oil and conductive carbon black are charged into a mixer and sufficiently mixed therein. The mixture is then kneaded in an extruder for plastics, followed by pelletizing, if necessary. The pellets are press-molded in such a way that information signals are recorded in a geometrical pattern to give an information signal recorded medium of the electrostatic capacity type. The recorded medium of this type is formed, upon reproduction, with an electrostatic capacity between the recorded medium itself and the electrode of a reproducing stylus. Accordingly, the step of depositing a thin metallic film is unnecessary and because fine particles of carbon black are covered with the resin, the step of depositing the thin dielectric film is also unnecessary. Thus, the fabrication of recorded medium is very simple with the production cost being low.

However, when the recorded medium which is made of such a composition including a conductive material such as carbon black is placed under high temperature and high humidity conditions, it deteriorates considerably, leading to the vital disadvantage that defects frequently appear in reproduced information signals at the time of the reproduction of the recorded medium and thus the reproduction operation becomes almost impossible.

SUMMARY OF THE INVENTION

It is accordingly an object of the present invention to provide a method for fabricating an information signal recorded medium of the electrostatic capacity type which can provide a stable recorded medium even under high temperature and high humidity conditions.

It is another object of the invention to provide a method for fabricating an information signal recorded medium by which the medium can be efficiently fabricated at low cost.

It is a further object of the invention to provide a method by which a durable information signal recorded medium can be obtained.

It is a still further object of the invention to provide a method for fabricating an information signal recorded medium which exhibits a good S/N characteristic when reproduced.

The above objects can be achieved, according to the present invention, by an improved method for fabricating an information signal recorded medium of the electrostatic capacity type which comprises providing a conductive resin composition comprising a vinyl chloride resin, about 1.5 to about 10 parts by weight of a stabilizer for the resin, about 0.1 to 1.5 parts by weight of a silicone oil, and about 15 to about 70 parts by weight of a conductive material, each based on 100 parts by weight of the vinyl chloride resin, kneading the conductive resin composition at a temperature sufficient for melting the resin, and press molding the kneaded composition in such a way that intended information signals are recorded in a geometrical pattern to give a recorded medium, the conductive resin composition being applied with 0.4 to 25 parts by weight of water prior to or during the kneading, the kneading being continued until the applied water is substantially removed.

The applied water should be evaporated or removed from the composition before the kneading is complete. To this end, the kneading should preferably be effected at temperatures ranging from about 140° to about 200° C. In general, the kneading is conducted in an extruder through which the conductive resin composition is extruded in the form of a sheet and then pelletized to have a desired size.

DETAILED DESCRIPTION AND EMBODIMENTS OF THE INVENTION

We have made an investigation as to why recorded media of conductive resin compositions including conductive materials such as carbon black considerably deteriorate when placed under high temperature and high humidity conditions. As a result, it has been found that ordinarily used carbon black added to vinyl chloride resins inevitably contains small amounts of inorganic salts of alkali metals or alkaline earth metals such as sodium chloride, calcium chloride, sodium carbonate and the like. When recorded media containing the metal salts are placed under high temperature and high humidity conditions, the metal salts deposit on the surface of the media, causing defects to rise on the medium surface. Upon reproduction, the defects will cause the stylus to jump thereover or will cause recorded information signals not to be partly read. Thus, reproduced pictures become defective.

The defects can almost completely be removed according to the method of the present invention, in which a conductive resin composition including a conductive material such as carbon black is applied or treated with water prior to or during kneading. By this, inorganic metal salts contained in the material do not deposit on an information signal recorded medium even when exposed to high temperature and high humidity conditions. The reason for this is not clearly known but these inorganic impurities may be chemically converted into more stable ones or may be completely dispersed in the resin composition to such an extent that deposits of a size capable of giving an adverse effect on the recorded medium are not formed.

The method of the present invention is described in more detail.

The conductive resin composition useful for making an information signal recorded medium of the electrostatic capacity type may be of any known type useful for this purposes. The resin component is usually a vinyl chloride homopolymer or a vinyl chloride copolymer resin which contains up to 91 wt% of vinyl chloride monomer. These resins are hereinafter referred to simply as a vinyl chloride resin. With the copolymer resin, the other component is a monomer copolymerizable with vinyl chloride such as a vinyl ether having an alkyl group, e.g. butyl, octyl or the like, an olefin having up to 11 carbon atoms such as ethylene, propylene, butylene, etc. Of these, a copolymer resin of vinyl chloride and a vinyl ether having an alkyl group is preferably used. Examples of the vinyl ether include butyl vinyl ether, octyl vinyl ether and the like. In general, the conductive resin composition comprises at least one stabilizer such as a dibutyltin and/or epoxy stabilizer. These stabilizers are well known in the art and include, for example, dibutyltin dilaurate, dibutyltin maleate, di-isodecyl-4,5-epoxy-tetra-hydrophthalate, 2-ethyhexyl epoxytallate, and the like. These dibutyltin and epoxy stabilizers may be used singly or in combination as usual.

The present invention is useful for the recorded medium making use of any conductive materials which contain such inorganic impurities as mentioned before. Typical of the conductive material is carbon black.

Carbon black which imparts conductivity to the recorded medium is used in an amount of about 15 to 70 parts by weight per 100 parts by weight of the vinyl chloride resin. Carbon black is finely powdered to have a size ranging from about 130 to 350 angstroms. Preferable carbon black is Ketjen Black EC®, Cabot CSX-150® or the like.

Aside from the above components, a silicone oil is added in an amount of about 0.1 to 1.5 parts by weight per 100 parts by weight of the vinyl chloride resin in order to impart the lubricating property to the recorded medium on contact with a stylus. Any silicone oils usually employed for this purpose may be used.

These starting materials are mixed and kneaded such as in an extruder at temperatures sufficient to melt the copolymer resin, e.g. at temperatures ranging from about 140 to about 200° C.

The present invention is characterized by the addition of water to the starting composition prior to or during the kneading. Water is added in an amount of about 0.4 to 25 parts by weight, preferably above 1 parts by weight, per 100 parts by weight of the vinyl chloride resin. By the addition of water, the composition is more effectively mixed or dispersed. Steam may be likewise added to the composition in a similar range of amount. In this case, steam is charged into the composition for a time sufficient to wet the composition. Usually, steam having a temperature of 110 to 190 and a pressure of about 0.5 to about 10 Kg/cm² is effectively used.

During the kneading of high temperature, water is lost by evaporation and is almost completely removed upon completion of the kneading. The kneading operation is usually effected continuously and is continued to allow the composition to stay for a residence time 0.5 to 3 minutes.

As a matter of course, the kneading may be effected either in a separate kneading apparatus or in an extruder. The kneaded composition is extruded into a sheet and cut to give pellets. The pellets are pre-molded as usual and press molded in a press molding machine provided with a stamper for video or audio disc to obtain a disc of the electrostatic capacity type according to the usual manner.

The present invention is particularly described by way of the following examples and comparative example.

EXAMPLE 1

100 parts by weight of a copolymer of a vinyl ether having an alkyl group and vinyl chloride, 1.5 parts by weight of a dibutyltin stabilizer, 2.0 parts by weight of an epoxy stabilizer, 0.7 parts by weight of a silicone oil and 22 parts by weight of carbon black (e.g. Kotjen Black EC) as a conductive material were charged into a mixer and agitated, during which 25 parts by weight of water was added, followed by mixing sufficiently. The mixture was fed into an extruder for plastics where it was kneaded and extruded as a sheet. The sheet was cut in the form of pellets. The pellets were then pre-molded by extrusion and the pre-molded sheet was press molded in a mold having a stamper for video disc to give a video disc of the electrostatic capacity type.

EXAMPLE 2

100 parts by weight of a copolymer resin of a vinyl ether having an alkyl group and vinyl chloride, 1.5 parts by weight of a dibutyltin stabilizer, 2.0 parts by weight of an epoxy stabilizer, 0.7 parts by weight of a silicone oil and 22 parts by weight of Ketjen Black EC were charged into a mixer where they were sufficiently agitated. The mixture was fed into an extruder and kneaded at a temperature of about 180° C. for 3 minutes during which water was added to or steam was forced into the mixture. After the kneading, the mixture was extruded into a sheet and cut to give pellets. The pellets were pre-molded by extrusion and press molded in a mold provided with a stamper for video disc to obtain a video disc of the electrostatic capacity type.

COMPARATIVE EXAMPLE 100 parts by weight of a copolymer resin of a vinyl ether having an alkyl group and vinyl chloride, 1.5 parts by weight of a dibutyltin stabilizer, 2.0 parts by weight of an epoxy stabilizer, 0.7 parts by weight of a silicone oil and 22 parts by weight of Ketjen Black EC were charged into a mixer and sufficiently agitated. The mixture was placed in a plastic extruder where it was kneaded at a temperature of about 180° C. for 3 minutes. The kneaded mixture was extruded into a sheet and cut to give pellets. The pellets were pre-molded by extrusion and then press molded in a mold having a stamper for video disc to obtain a video disc of the electrostatic capacity type.

The video discs obtained in the above examples and comparative example were allowed to stand under conditions of a temperature of 50° C. and a relative humidity of 90% for 96 hours and each set in a reproducing device to check its picture defects. As a result, it was found that the disc obtained in Example 1 involved one picture defect per minute, the disc obtained in Example 2 involved 1.5 picture defects per minute and the disc obtained in Comparative Example involved more than 10 picture defects per minute. From this it will be appreciated that the discs of the invention are very excellent in reproducing characteristic.

This is considered due to the fact that the video disc of Comparative Example allows deposition of alkali metal or alkaline earth metal salts on the surface layer of the disc when placed under the high temperature and high humidity conditions. As a result, part of pits formed in the disc are lost or rising defects are formed on the disc surface, so that the stylus cannot correctly be traced, causing the defects in reproduced picture.

In contrast, the video discs obtained in examples 1 and 2 involves little or no deposition of the salts on the disc surface. This is believed due to the addition of water or steam during or prior to the kneading as discussed before.

The addition of water or steam produces another advantage in that the molding of video disc from pellets proceeds efficiently with the pressing time being shortened. Moreover, the conductive material is satisfactorily dispersed in the resin with the aid of water, so that the S/N characteristic at the time of reproduction of the disc is improved.

In the above examples, the video discs are illustrated as a recorded medium but digital audio discs can likewise be obtained.

What is claimed is:

1. A method for fabricating an information signal recorded medium of the electrostatic capacity type which comprises providing a conductive resin composition comprising a vinyl chloride resin, about 1.5 to 10 parts by weight of a stabilizer for the copolymer resin, about 0.1 to 1.5 parts by weight of a silicone oil and about 15 to about 70 parts by weight of a carbon black conductive material, each based on 100 parts by weight of the vinyl chloride resin, kneading the conductive resin composition at a temperature sufficient for melting the copolymer resin, and press molding the kneaded composition in such a way that intended information signals are recorded in geometrical patterns to give a recorded medium, the conductive resin composition being applied with about 0.4 to 25 parts by weight of water per 100 parts by weight of the resin prior to or during the kneading, the kneading being continued until the applied water is substantially removed.

2. A method according to claim 1, wherein the water is in the form of steam.

3. A method according to claim 1, wherein the kneading is effected at a temperature ranging from about 140° to about 200° C. for 0.5 to 3 minutes.

4. A method according to claim 1, wherein said vinyl chloride resin is vinyl chloride homopolymer.

5. A method according to claim 1, wherein said vinyl chloride resin is a copolymer with a vinyl ether or an olefinic monomer.

6. A method according to claim 1, wherein the water is added in an amount of over 1 part per 100 parts by weight of the vinyl chloride resin.

* * * * *